United States Patent
Wu et al.

(10) Patent No.: US 8,760,458 B2
(45) Date of Patent: Jun. 24, 2014

(54) SCAN-TYPE DISPLAY DEVICE CONTROL CIRCUIT

(75) Inventors: Ken-Tang Wu, Hsinchu (TW); Fu-Yang Shih, Hsinchu (TW)

(73) Assignee: Macroblock, Inc., Hsinchu (TW)

(*) Notice: Subject to any disclaimer, the term of this patent is extended or adjusted under 35 U.S.C. 154(b) by 974 days.

(21) Appl. No.: 12/707,192

(22) Filed: Feb. 17, 2010

(65) Prior Publication Data

US 2011/0074799 A1  Mar. 31, 2011

(30) Foreign Application Priority Data

Sep. 30, 2009 (TW) .............................. 98133304 A

(51) Int. Cl.
*G09G 5/39* (2006.01)
(52) U.S. Cl.
USPC .......................................... 345/532; 345/204
(58) Field of Classification Search
None
See application file for complete search history.

(56) References Cited

U.S. PATENT DOCUMENTS

| | | | |
|---|---|---|---|
| 2002/0012008 A1* | 1/2002 | Takagi | 345/691 |
| 2002/0063676 A1* | 5/2002 | Murade et al. | 345/100 |
| 2003/0016189 A1* | 1/2003 | Abe et al. | 345/55 |
| 2004/0046752 A1 | 3/2004 | Willis et al. | |
| 2006/0033692 A1 | 2/2006 | Sako et al. | |

FOREIGN PATENT DOCUMENTS

EP 1814365 A1 8/2007

OTHER PUBLICATIONS

Macroblock, Preliminary Datasheet, 16-Channel PWM-Embedded LED Driver, MBI5031, Aug. 2006, p. 1-24, V2.00, Hsinchu, Taiwan, ROC.
Peter F. Van Kessel, Electronics for DLP Technology Based Projection Systems, Symposium on VLSI Circuits Digest of Technical Papers, XP-002591359, 2001, p. 91-94.
Macroblock, Preliminary Datasheet, 16-Channel Constant Current LED Driver With 16-bit PWM Control and Dot-Dorrection, MBI5040, Mar. 2009, p. 1-31, V1.00, Hsinchu, Taiwan, ROC.

* cited by examiner

*Primary Examiner* — Christopher R Lamb
(74) *Attorney, Agent, or Firm* — Morris Manning & Martin LLP; Tim Tingkang Xia, Esq.

(57) ABSTRACT

A scan-type display device control circuit is suitable for receiving successive frame data and driving a light-emitting diode (LED) display device accordingly. The scan-type display device control circuit includes a ping-pong buffer, a data storage controller, a line scan controller, a display buffer, and a scrambled pulse width modulation (PMW) signal generating device. The scan-type display device control circuit can utilize frame data circularly and repeatedly, so as to prevent a great mass of data from being transmitted repeatedly. Therefore, a band width for inputting data can be reduced significantly. Furthermore, the scrambled PMW signal generating device can scramble a PMW signal with a long period into a plurality of scrambled PMW signals with a short period. Therefore, the refresh rate can be efficiently enhanced without changing the band width for inputting data.

6 Claims, 10 Drawing Sheets

SCAN-TYPE DISPLAY DEVICE CONTROL CIRCUIT

CROSS-REFERENCE TO RELATED APPLICATIONS

This non-provisional application claims priority under 35 U.S.C. §119(a) on Patent Application No(s). 098133304 filed in Taiwan, R.O.C. on Sep. 30, 2009, the entire contents of which are hereby incorporated by reference.

BACKGROUND

1. Field of Invention

The present invention relates to a circuit, and more particularly to a scan-type display device control circuit.

2. Related Art

In recent years, the cost of manufacturing light-emitting diodes (LEDs) is greatly reduced. Therefore, LED displays have been widely applied in various occasions, such as gymnasiums and billboards.

Usually, an LED display device uses thousands of LEDs as displaying pixels. A frame may be constituted by pixels having different brightness, and multiple frames may be displayed in sequence to constitute a dynamic image.

The pixels are controlled by a controller respectively. According to input data, the controller transmits an ON signal or an OFF signal to an LED driver, thereby controlling the brightness of the pixels.

Generally speaking, the dynamic image will switch about 60 frames every second. That is to say, a frame rate of the input frames is 60 Hz. Since the period of switching the frames is very short, when watching the progressive image, people will feel that the progressive image is continuous due to the visual staying phenomenon.

Furthermore, the time for displaying a whole frame is referred to as a refresh time. The inverse number of the refresh time is a refresh rate. The higher the refresh rate is, the more difficulty the LED display device flickers (for example, when taking a photo by using a high-speed shutter of a photography appliance).

In another aspect, quite a number of LED drivers are required in a common LED display device. In order to reduce the number of the LED drivers, the LED display device can adopt a scan-type controller. In the scan-type controller, multiple LEDs may be driven in different time by a switching device. Therefore, the same one LED driver may drive multiple LEDs.

Although the scan-type controller can save the number of LED drivers, for the same LED driver, the data quantity to be processed is multiplicative. That is to say, the LED driver needs a larger transmission band width. Furthermore, since more time will be spent for displaying a whole frame, the refresh rate will descend accordingly.

SUMMARY

Accordingly, the present invention is a scan-type display device control circuit, which is capable of enhancing a refresh rate of a scan-type display device and reducing a transmission band width of an LED driver.

The present invention provides a scan-type display device control circuit, which is suitable for receiving a plurality of successive frame data and driving a light-emitting diode (LED) display device accordingly. The scan-type display device control circuit comprises a ping-pong buffer, a data storage controller, a line scan controller, a display buffer, and a scrambled pulse width modulation (PWM) signal generating device.

The ping-pong buffer comprises a first storage area and a second storage area. The data storage controller receives the frame data in sequence and stores the frame data in the first storage area or the second storage area alternately. The line scan controller, logically connected to the ping-pong buffer, is used to capture line data in the frame data from the first storage area or the second storage area alternately. The display buffer, logically connected to the line scan controller, is used to temporarily store the line data.

The scrambled PWM signal generating device is logically connected to the display buffer and the line scan controller. The scrambled PWM signal generating device captures the line data and generates a scrambled PWM signal according to the line data, so as to drive the LED display device.

In an embodiment of the present invention, the line data is M bits. After elapsing of a scan line changing period, the scrambled PWM signal generating device captures another line data and generates another scrambled PWM signal according to the other line data. The scan line changing period is $2^N$ operation periods, and N is smaller than M.

In another embodiment of the present invention, the line data is M bits. After elapsing of a scan line changing period, the scrambled PWM signal generating device captures another line data and generates another scrambled PWM signal according to the other line data. The scan line changing period is $2^N$ operation periods plus a deadtime period, and N is smaller than M.

The present invention provides another scan-type display device control circuit, which is suitable for receiving a plurality of successive frame data and driving an LED display device accordingly. The scan-type display device control circuit comprises a ping-pong buffer, a data storage controller, a line scan controller, and a pulse width modulation (PWM) signal generating device. The line scan controller, after elapsing of a scan line changing period, captures another line data of the frame data, and transmits the other line data to the PWM signal generating device. The scan line changing period is $2^N$ operation periods plus a deadtime period.

The scan-type display device control circuit can utilize frame data circularly and repeatedly, so as to prevent a great mass of data from being transmitted repeatedly. Therefore, a band width for inputting data can be reduced significantly. Furthermore, the scrambled PWM signal generating device can scramble a PWM signal with a long period into a plurality of scrambled PWM signals with a short period. Therefore, the refresh rate can be efficiently enhanced without changing the band width for inputting data.

BRIEF DESCRIPTION OF THE DRAWINGS

The present invention will become more fully understood from the detailed description given herein below for illustration only, and thus are not limitative of the present invention, and wherein.

DETAILED DESCRIPTION

The detailed features and advantages of the present invention will be described in detail in the following embodiments. Those skilled in the arts can easily understand and implement the content of the present invention. Furthermore, the relative objectives and advantages of the present invention are apparent to those skilled in the arts with reference to the content disclosed in the specification, claims, and drawings. The following embodiments are used to further illustrate the opinions of the present invention in detail, but the scope of the present invention is not limited by any opinion.

Figure 1:
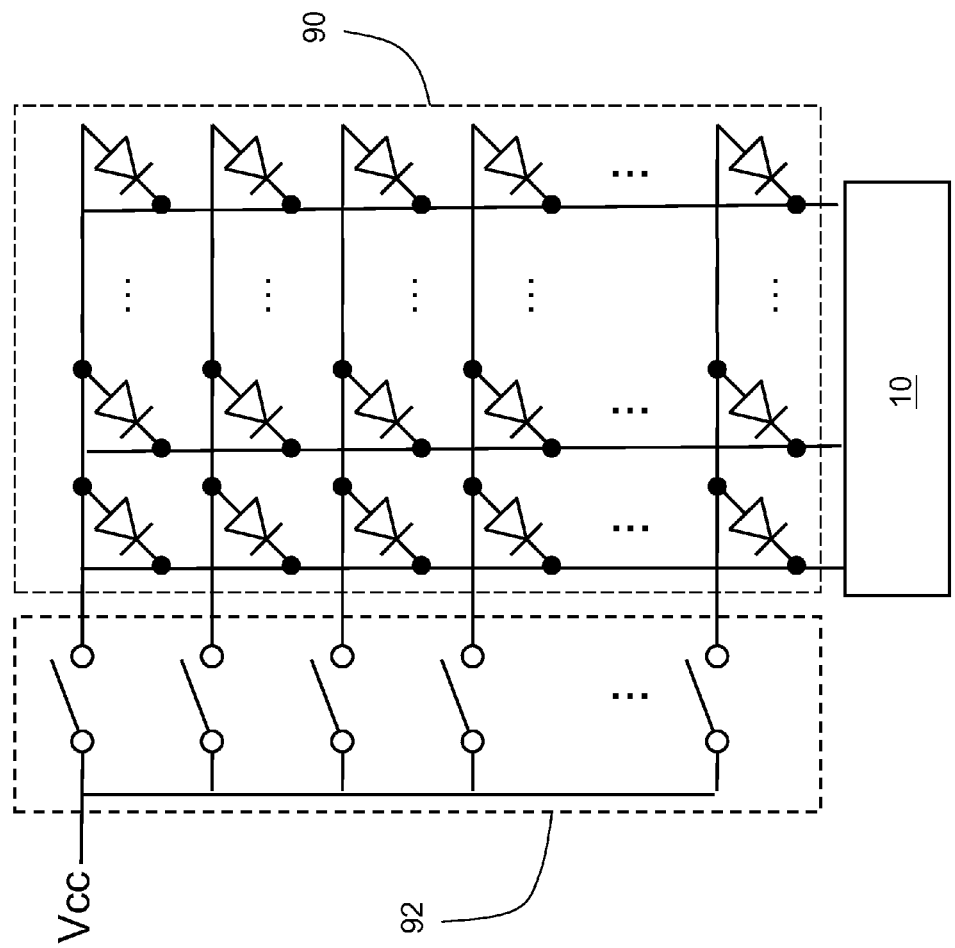
FIG. 1 is a structural view of a scan-type LED display device of the present invention.

Referring FIG. 1, a structural view of an LED display device 90 is shown. The LED display device 90 is a scan-type display screen and need be used with a switch 92. For example, the LEDs on the LED display device 90 can be divided as a first line LED, a second line LED, a third line LED, . . . and an eighth line LED. The switch 92 turns on the first line LED, the second line LED, the third line LED, . . . and the eighth line LED circularly and sequentially.

When the switch 92 turns on the first line LED, a scan-type display device control circuit 10 outputs a drive signal corresponding to the first line LED. In a similar way, drive signals corresponding to the other line LEDs are also output.

Figure 2:
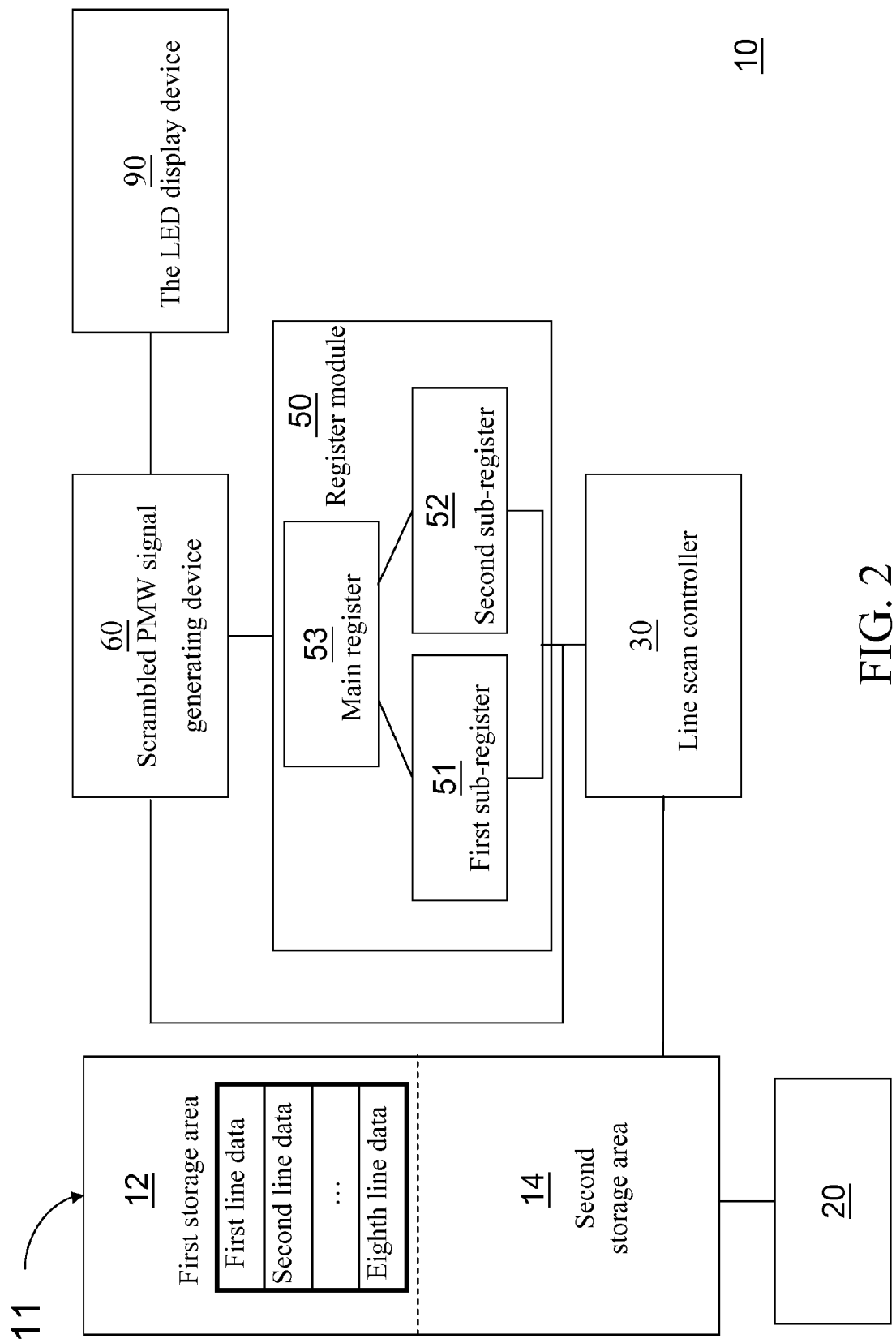
FIG. 2 is a block diagram of a system according to a first embodiment of the present invention.

Referring FIG. 2, a block diagram of a system according to a first embodiment of the present invention is shown. The scan-type display device control circuit 10 comprises a ping-pong buffer 11, a data storage controller 20, a line scan controller 30, a display buffer 50, and a scrambled PWM signal generating device 60.

The ping-pong buffer 11 comprises a first storage area 12 and a second storage area 14. The ping-pong buffer 11 can write in and read data continuously. The data storage controller 20 is used to receive the frame data in sequence, and store the data in the first storage area 12 or the second storage area 14 alternately.

The line scan controller 30, logically connected to the ping-pong buffer 11, is used to capture line data in the frame data from the first storage area 12 or the second storage area 14 alternately.

The display buffer 50, logically connected to the line scan controller 30, is used to temporarily store the line data in the frame data in the first storage area 12 or the second storage area 14. The display buffer 50 may be a flip-flop or a SRAM (Static Random Access Memory).

The scrambled PWM signal generating device 60 is logically connected to the line scan controller 30 and the display buffer 50. The scrambled PWM signal generating device 60 is used to capture the line data and generate a scrambled PWM signal according to the line data.

The detailed operation method of the present invention is illustrated below.

In this embodiment, the frame data is gray-scale frame data. That is to say, the information stored in the frame data represents a gray-scale brightness of the frame. A value of the gray-scale brightness can represent an intensity of any color. The larger the value of the gray-scale brightness is, the brighter the color is. On the contrary, the smaller the value of the gray-scale brightness is, the darker the color is. For example, for a sixteen-bit gray-scale brightness, the gray-scale brightness "65535" represents white, and the gray-scale brightness "0" represents black.

First, the data storage controller 20 stores first frame data (frame 1) of a first frame period in the first storage area 12, stores second frame data (frame 2) of a second frame period in the second storage area 12, stores third frame data (frame 3) of a third frame period in the first storage area 12, and stores fourth frame data (frame 4) of a fourth frame period in the second storage area 14. According to such a sequence, the frame data is continuously stored into the first storage area 12 or the second storage area 14.

During the second frame period, not only the second frame data is written into the second storage area 14, but also the first frame data is read from the first storage area 12. During the third frame period, not only the third frame data is written into the first storage area 12, but also the second frame data is read from the second storage area 14. Due to the continuous and alternate writing-in and reading steps, the ping-pong buffer 11 does not generate an interval of break between reading and writing-in.

During the same frame period, the line scan controller 30 captures line data of the frame data sequentially and circularly, and sends the captured line data to the display buffer 50. Since each frame data is processed by the same manner, only the first frame data is described herein. For example, the first frame comprises eighth line data (a first line data, a second line data, a third line data . . . and an eighth line data). The line scan controller 30 captures the line data in a sequence of the first line data, the second line data, the third line data . . . and the eighth line data. After the eighth line data is captured, the line scan controller 30 then captures the first line data again. With such sequential circles, the line scan controller 30 captures all line data in the frame data and transmits the line data to the display buffer 50.

The display buffer 50 comprises a first sub-register 51, a second sub-register 52, and a main register 53. The first sub-register 51 and the second sub-register 52, logically connected to the line scan controller 30, are used to temporarily store line data of the first storage area 12 or the second storage area 14. The main register 53 is used to capture the line data in the first sub-register 51 or the second sub-register 52.

The scrambled PWM signal generating device 60 can scramble a PWM signal with a long period into a plurality of scrambled PWM signals with a short period. For example, for a sixteen-bit gray-scale brightness, the length of the data stored in each line data is sixteen bits. The display period of the PWM signal corresponding to the line data is 65,536 ($2^{16}$) cycles. The scrambled PWM signal generating device 60 can scramble the PWM signal having a length of 65,536 cycles into a plurality of (for example, 64) scrambled PWM signals. In other words, the display period of each scrambled PWM signal is 1,024 ($2^{10}$) cycles.

Herein, the cycle can be defined as a time period from a rising edge of one clock signal to a rising edge of another adjacent clock signal, and can also be defined as a time period from a falling edge of one clock signal to a falling edge of another adjacent clock signal.

The scrambled PWM signal generating device 60 transmits the scrambled PWM signals to the LED display device 90. Every scan line changing period, the line scan controller 30 performs actions of line-changing. For example, the line scan controller 30 captures the first line data, and transmits the first line data to the scrambled PWM signal generating device 60 to output a drive signal. After elapsing of a scan line changing period (1,024 cycles), the line scan controller 30 captures the second line data, and transmits the second line data to the scrambled PWM signal generating device 60 to output a drive signal. The steps are repeated continuously, and the line scan controller 30 captures the first line data, the second line data . . . the eighth line data in sequence. After capturing the eighth line data, the line scan controller 30 captures the first line data again.

Figure 3A:
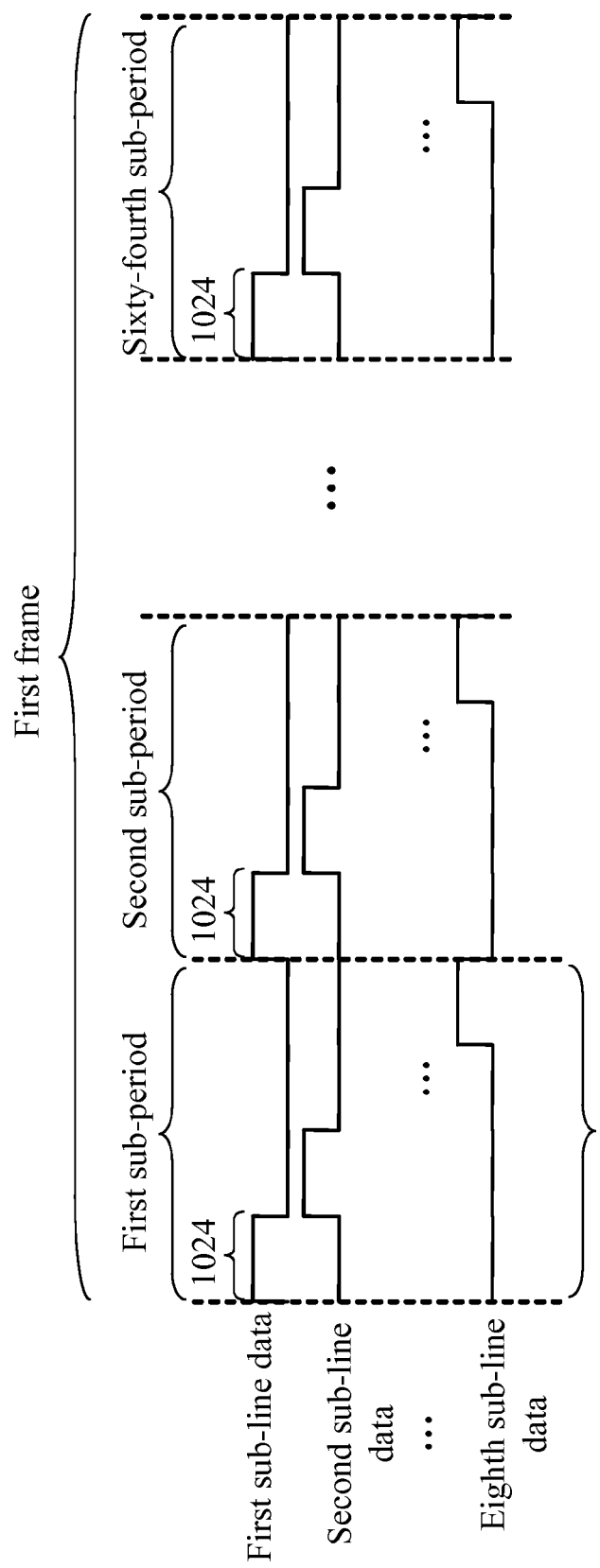
FIGS. 3A and 3B are timing diagrams of a drive signal according to the present invention.

Referring to FIG. 3A, a timing diagram of the drive signal is shown. During the first scan line changing period (1024 cycles), the first line data is transmitted to the scrambled PWM signal generating device 60 to generate a scrambled PWM signal. During the second scan line changing period, i.e., the next 1024 cycles, the second line data is transmitted to the scrambled PWM signal generating device 60 to generate a scrambled PWM signal. The actions are repeated, and the first line data, the second line data . . . and the eighth line data are transmitted to the scrambled PWM signal generating device 60 to generate a scrambled PWM signal in sequence.

After eight scan line changing periods, the frame data can be fully displayed. The total time of the eight sub-signal periods is called a sub-period. In this embodiment, a length of a first sub-period is 8,192 (8×1,024) cycles, while in a common method, 524,288 (8×65,536) cycles are required to display a full frame. The time for displaying a full frame by the scan-type display device control circuit 10 of the present invention is one sixty-fourth of the common method. That is to say, the refresh rate of the scan-type display device control circuit 10 is 64 times of the common method.

In a line scan-type LED display device 90, in order to prevent occurrence of ghosting, upon completion of the drive signal corresponding to the line data, the drive signal corresponding to another line data may be transmitted again after a break off, which is called a deadtime period.

Figure 3B:
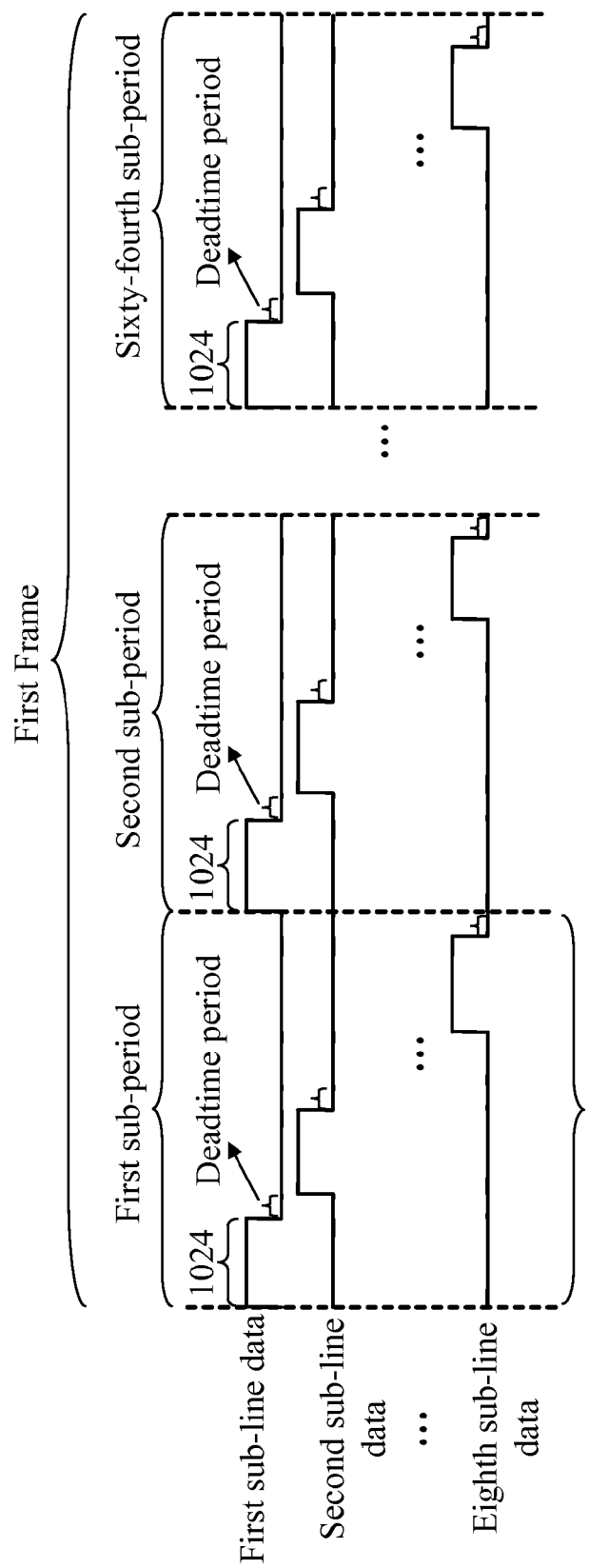

Referring to FIG. 3B, a timing diagram of a drive signal is shown. During the first 1024 cycles, the first line data is transmitted to the scrambled PWM signal generating device 60 to generate a scrambled PWM signal. Afterwards, during the 1025.sup.th cycle, the scan-type display device control circuit 10 will intermit generation of any drive signal. The length of the 1025.sup.th period is the length of the deadtime period.

In an embodiment of the present invention, the line scan controller 30 has an external clock signal input port. The external clock signal input port is used to input an external clock signal. The external clock signal consists of multiple sub-clock signals, and the period of each sub-clock signal corresponds to a cycle. That is to say, the length of the external clock signal may be changed, thereby changing the length of the deadtime period.

The scrambled PWM signal generating device 60 can be implemented as at least two embodiments, which will be illustrated below.

Figure 4A:
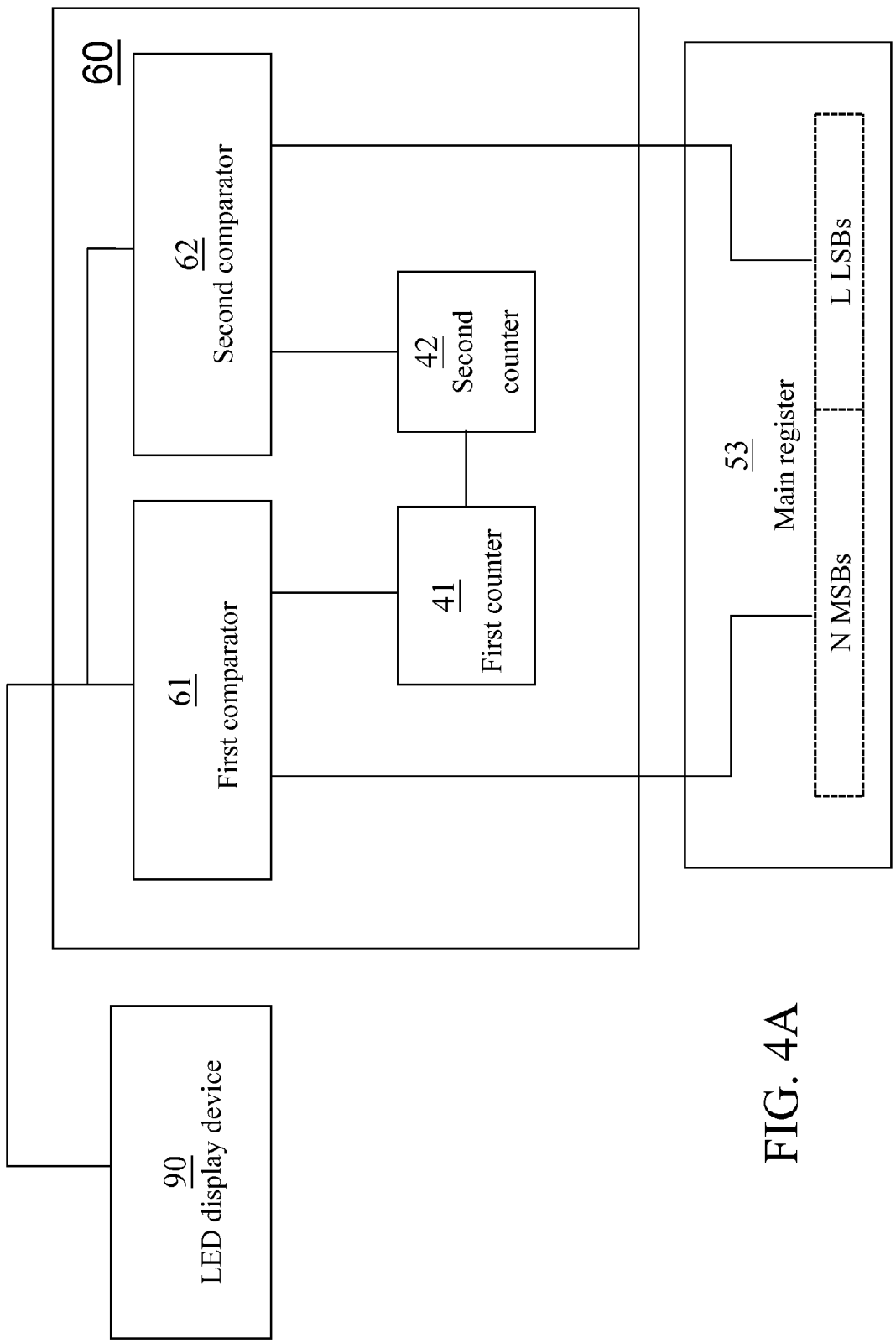
FIG. 4A is a block diagram of a system of a first embodiment of the scrambled PWM signal according to the present invention.

FIG. 4A is a block diagram of a system according to a first embodiment of the scrambled PWM signal generating device 60. The scrambled PWM signal generating device 60 comprises a first counter 41, a first comparator 61, a second counter 42, and a second comparator 62.

The first counter 41 is used to output a first numerical signal. The first numerical signal preferably is an ascending signal. The first comparator 61 has a first input end and a second input end. The first input end is used to input the first N most significant bits (MSBs) of the line data, and the second input end is used to input the first numerical signal. The first comparator outputs a main signal according to the first input end and the second input end. For example, when the value of the first input end is larger than that of the second input end, the first comparator 61 outputs a "logic 1" signal, and when the value of the first input end is smaller than that of the second input end, the first comparator 61 outputs a "logic 0" signal. Only when the "logic 1" signal is transmitted to the LED, i.e., only when the value of the first N MSBs of the line data is larger than the value of the first counter 41, the LED emits light.

The second counter 42 is used to output a second numerical signal. The second comparator 62 has a third input end and a fourth input end. The third input end is used to input the last L least significant bits (LSBs) of the line data, and the fourth input end is used to input the second numerical signal. The second comparator 62 outputs a compensation signal according to the third input end and the fourth input end. For example, when the value of the third input end is larger than that of the fourth input end, the second comparator 62 outputs a "logic 1" signal, and when the value of the third input end is smaller than that of the fourth input end, the second comparator 62 outputs a "logic 0" signal. The second numerical signal changes its output value every sub-period. Therefore, the break points of the output periods of the scrambled PWM signals of the lines are recorded at the same time, and when the same line is scanned next time, the scrambled PWM signal continues to be output from the break point of the output period of the preceding scrambled PWM signal. Thus, a PWM output period can be fully completed without being influenced by the break of scanning The second counter 42 can adopt a sequential counting procedure or a uniform hop counting procedure. The uniform hop counting procedure can make the scrambled PWM signals to be output more uniformly.

The scrambled PWM signal output by the scrambled PWM signal generating device 60 comprises a main signal output by the first comparator 61 and a compensation signal output by the second comparator 62. That is to say, the scrambled PWM signal can be divided into a first segment and a second segment in respect of time, the signal in the first segment is the main signal, and the signal in the second segment is a compensation signal.

For example, for the sixteen-bit line data, it is assumed that the decimal value of the line data is "6405." The first ten MSBs of the line data represent a decimal value "100," and the last six LSBs of the line data represent a decimal value "5." The line data is scrambled into 64 scrambled PWM signals, and the length of each of the scrambled signals is 1024 cycles. Since the last six LSBs of the line data represent a decimal value "5," among the 64 scrambled PWM signals, the compensation signal of the five scrambled PWM signals is "1," and the compensation signal of the other 59 scrambled PWM signals is "0." That is to say, the duty cycle of the five scrambled PWM signals is $$\frac{101}{1024},$$

and the duty cycle of the other 59 scrambled PWM signals is $$\frac{100}{1024}.$$

In order to reduce low frequency components and visual flickers, the second counter 42 can adopt the uniform hop counting procedure, so as to make the five scrambled PWM signals with the duty cycle being $$\frac{101}{1024}$$

be distributed in the 64 scrambled PWM signals uniformly. The implementation method can be obtained with reference to ROC Patent Application No. 200729133.

Figure 4B:
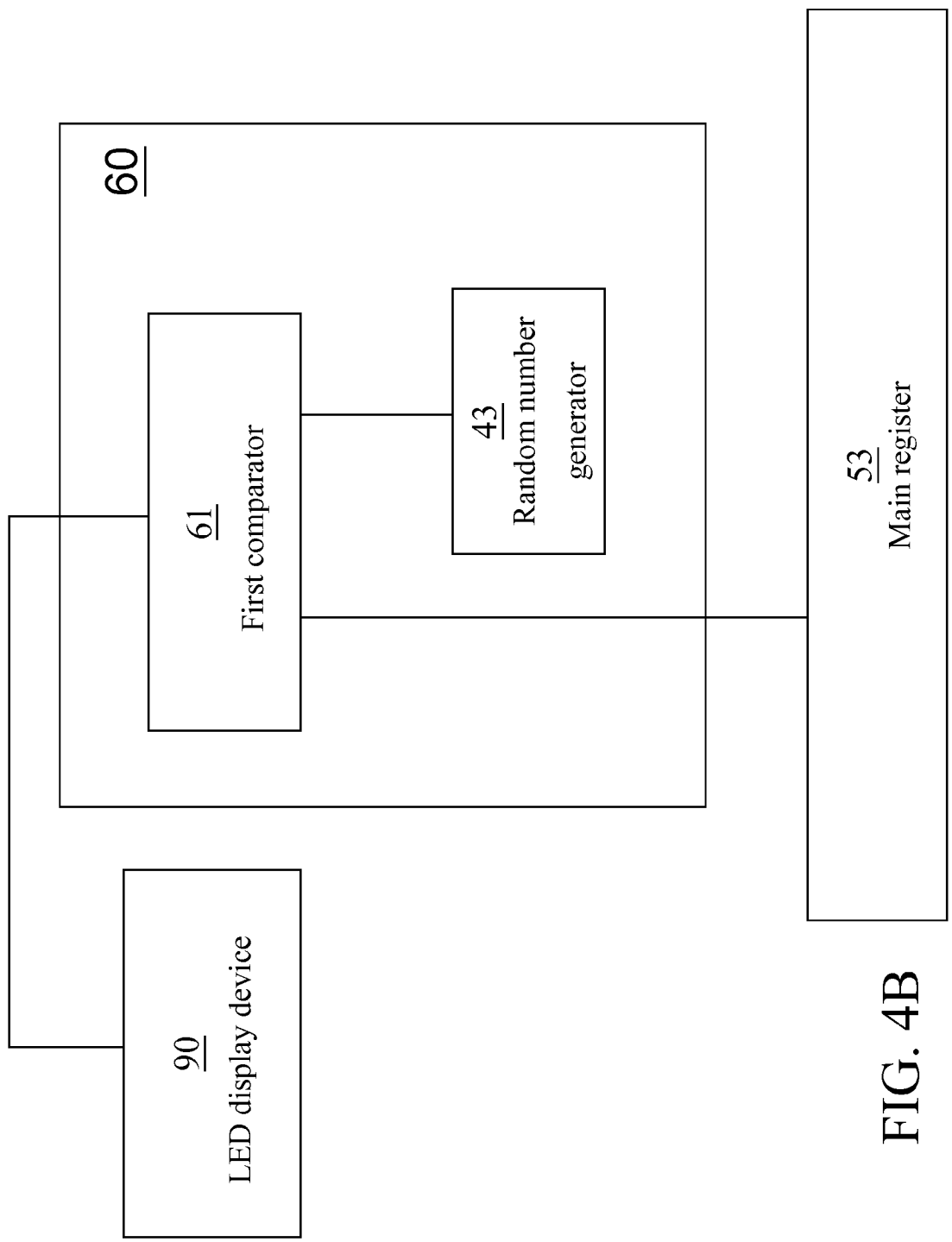
FIG. 4B is a block diagram of a system of a second embodiment of the scrambled PWM signal according to the present invention.

FIG. 4B is block diagram of a system in a second embodiment of the scrambled PWM signal generating device 60. The scrambled PWM signal generating device 60 comprises a random number generator 43 and a first comparator 61. The random number generator 43 generates a random number signal. The first comparator 61 comprises a first input end and a second input end. The first input end is used to input the line data, and the second input end is used to input a random number signal. When the value of the first input end is larger than that of the second input end, the first comparator 61 outputs a first signal, and when the value of the first input end is equal to or smaller than that of the second input end, the first comparator outputs a second signal. For example, the first signal is a "logic 1" signal, and the second signal is a "logic 0" signal. Only when the "logic 1" signal is transmitted to the LED, i.e., the value of the line data is larger than random number signal generated by the random number generator 43, the LED emits light.

In the two embodiments, the scan line changing periods are the same. The line feed action is performed by the line scan controller 30.

Figure 5A:
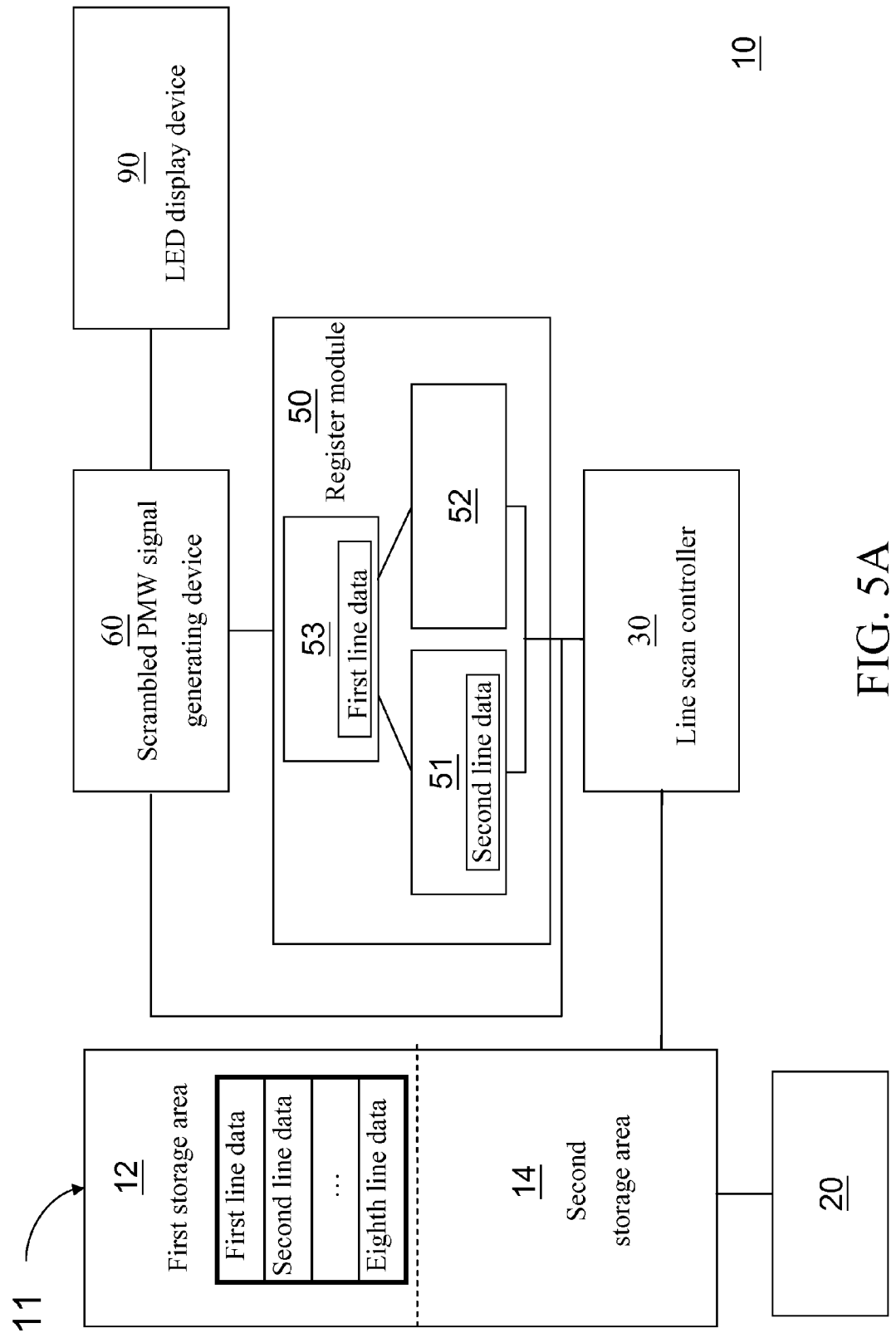
FIGS. 5A, 5B, and 5C are schematic views of the operation method in FIG. 2 of the present invention.
Figure 5B:
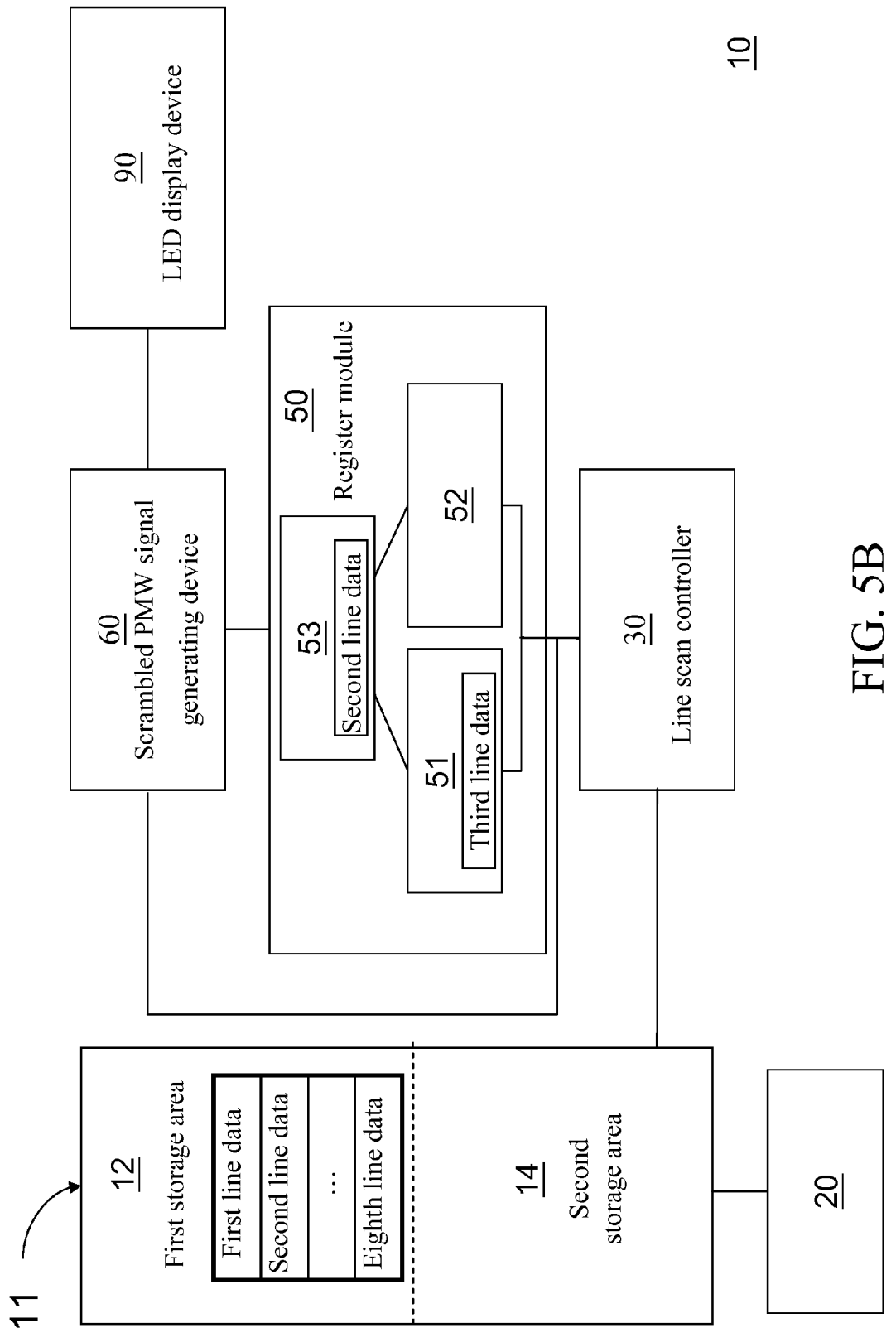
Figure 5C:
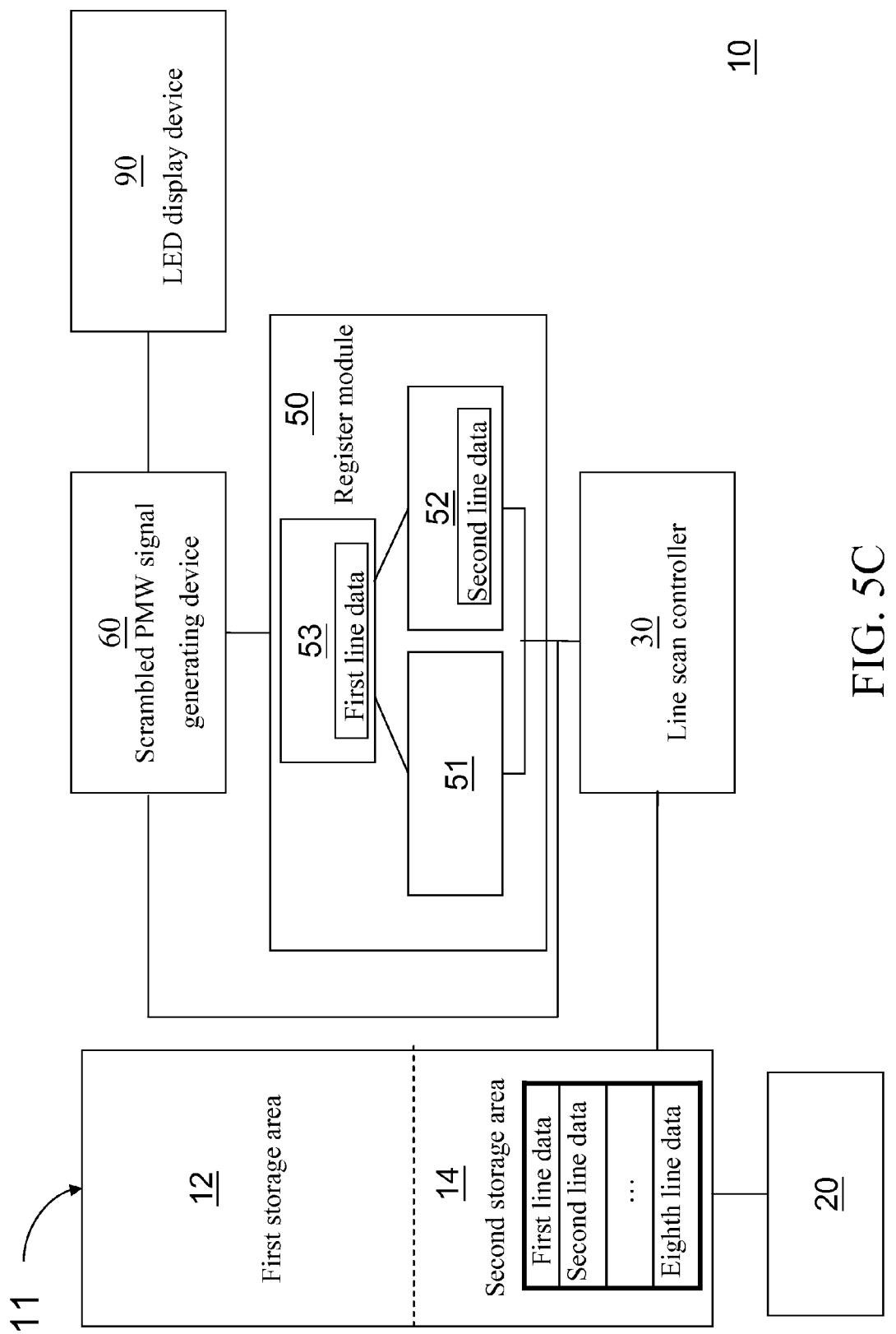

In order to further illustrate the flow of generating the PWM signal, please refer to FIGS. 5A, 5B, and 5C. FIGS. 5A, 5B, and 5C are schematic views of the operation in FIG. 2.

Referring to FIG. 5A, the first line data is stored in the main register 53, and the second line data is stored in the first sub-register 51. At this time, the scrambled PWM signal generating device 60 captures the value of the main register 53 and generates a scrambled PWM signal.

Referring to FIG. 5B, After elapsing of a scan line changing period, the second line data originally stored in the first sub-register 51 in FIG. 5 is transmitted to the main register 53, and the line scan controller 30 transmits the third line data to the first sub-register 51.

After the scan-type display device control circuit 10 has output the scrambled PWM signals of the first line data, the second line data . . . and the eighth line data in sequence, during the next time period, the scan-type display device control circuit 10 outputs the scrambled PWM signal of the first line data again. By capturing the line data of the same frame data repeatedly in the same manner, the scan-type display device control circuit 10 can avoid transmitting a great mass of frame data repeatedly. Therefore, the band width for inputting data may be reduced significantly.

Furthermore, the line scan controller 30 has an instruction input port (not shown). When the instruction input port (not shown) receives a frame switching instruction, the main register 53 captures data from the second sub-register 52 instead of the first sub-register 51 originally, or from the first sub-register 51 instead of the second sub-register 52 originally. Referring to FIG. 5C, the line data from the second sub-register 52 is transmitted to the main register 53, i.e., the operation method in FIG. 5A is converted to the operation method in FIG. 5C.

By the structure of two registers (the first sub-register 51 and the second sub-register 52) and the mechanism of storing data in advance, the scan-type display device control circuit 10 can transmit the drive signals corresponding to the frame data without a break.

In an embodiment of the present invention, if a plurality of values exists in line data, the drive signals corresponding to the plurality of values can be output in parallel. The scan-type display device control circuit 10 comprises a plurality of display buffers 50 and a plurality of scrambled PWM signal generating devices 60.

Figure 6:
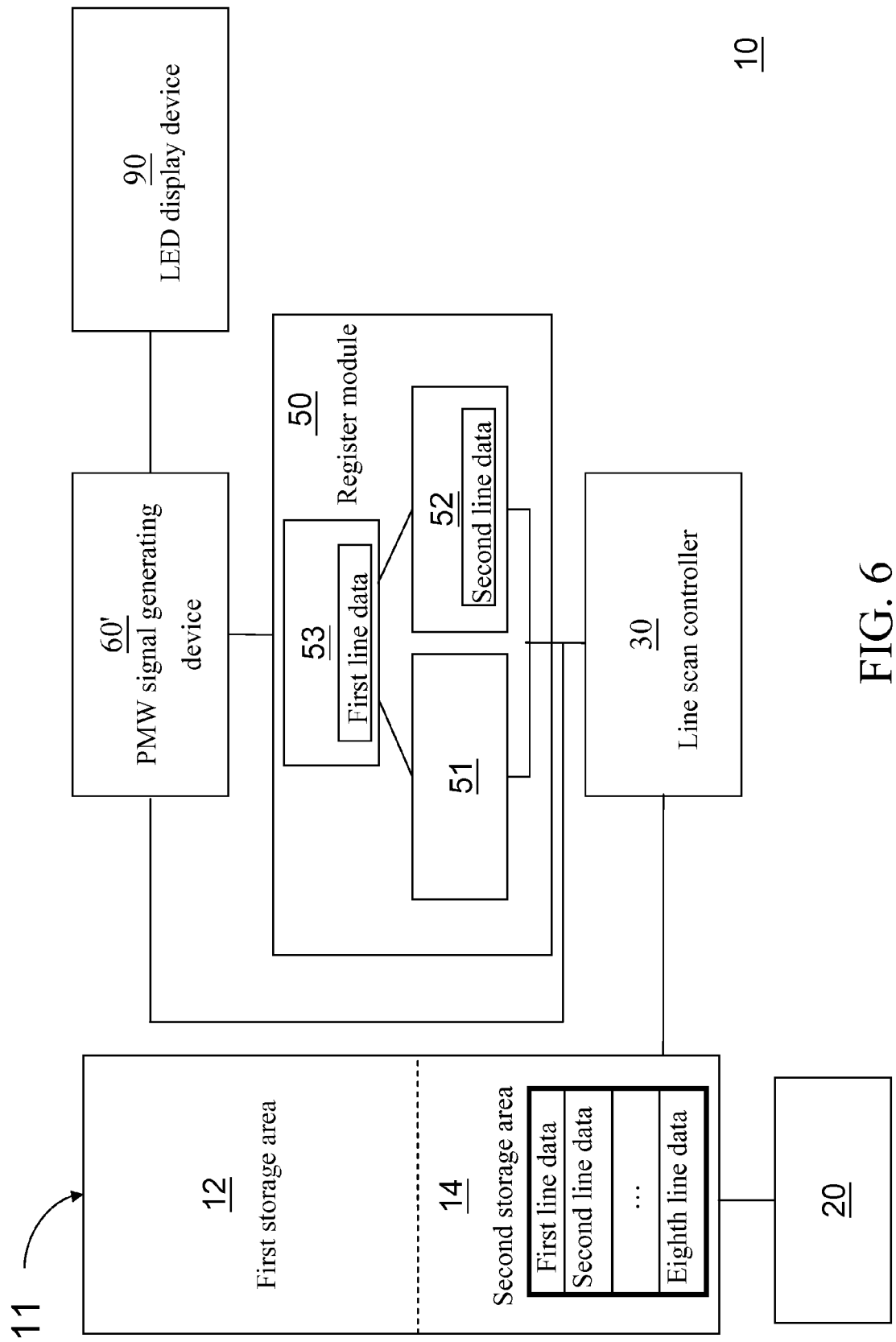
FIG. 6 is a block diagram of a system according to a second embodiment of the present invention.

Referring to FIG. 6, a block diagram of a system according to a second embodiment of the present invention is shown. The scan-type display device control circuit 10 comprises a ping-pong buffer 11, a data storage controller 20, a line scan controller 30, a display buffer 50, and a PWM signal generating device 60'. The PWM signal generating device 60' can be a common PWM signal generating device, and can also be a scrambled PMW signal generating device 60. The operation mode of the scan-type display device control circuit 10 is similar to that of the first embodiment, and will not be repeated herein.

In view of the above, the scan-type display device control circuit in the present invention can utilize frame data circularly and repeatedly, so as to prevent a great mass of data from being transmitted repeatedly. Therefore, a band width for inputting data can be reduced significantly. Furthermore, the scrambled PWM signal generating device can scramble a PWM signal with a long period into a plurality of scrambled PWM signals with a short period. Therefore, the refresh rate can be efficiently enhanced without changing the band width for inputting data.

What is claimed is:

1. A scan-type display device control circuit, suitable for receiving a plurality of successive frame data and driving a light-emitting diode (LED) display device accordingly, comprising:

a ping-pong buffer, comprising a first storage area and a second storage area;

a data storage controller, for receiving the frame data in sequence and storing the frame data in the first storage area or the second storage area alternately;

a line scan controller, logically connected to the ping-pong buffer, for capturing a plurality of line data of the frame data from the first storage area or the second storage area alternately;

a display buffer, logically connected to the line scan controller, for temporarily storing the line data; and a scrambled pulse width modulation (PWM) signal generating device, logically connected to the display buffer or the line scan controller, wherein the scrambled PWM signal generating device captures the line data and generates a scrambled PWM signal according to the line data;

wherein for each frame, a displaying period is divided into a first number of sub-periods, each sub-period is divided into a second number of scan line changing periods, the frame data is divided into the second number of line data, and each line data is scrambled by the scrambled PWM signal generating device into the first number of sub-line data, such that each sub-line data corresponds to one scan line changing period;

in each sub-period, the corresponding sub-line data of each of the second number of line data is sequentially transmitted for displaying an image of the frame, such that each frame is displayed the first number of times in the displaying period; and the line data is M bits, the scan line changing period is $2^N$ cycles plus a deadtime period, and N is smaller than M.

2. The scan-type display device control circuit according to claim 1, wherein a length of the deadtime period is controlled by an external clock signal.

3. The scan-type display device control circuit according to claim 1, wherein the scrambled PWM signal comprises a main signal and a compensation signal, and the scrambled PWM signal generating device comprises:
   a first counter, for outputting a first numerical signal;
   a first comparator, having a first input end and a second input end, wherein the first input end is used to input first N most significant bits (MSBs) of the line data, the second input end is used to input the first numerical signal, and the first comparator outputs the main signal according to the first input end and the second input end;
   a second counter, for outputting a second numerical signal; and
   a second comparator, having a third input end and a fourth input end, wherein the third input end is used to input last L least significant bits (LSBs) of the line data, the fourth input end is used to input the second numerical signal, and the second comparator outputs the compensation signal according to the third input end and the fourth input end.

4. The scan-type display device control circuit according to claim 1, wherein the scrambled PMW signal generating device comprises:
   a random number generator, for outputting a random number signal; and
   a first comparator, having a first input end and a second input end, wherein the first input end is used to input the line data, the second input end is used to input the random number signal, and the first comparator outputs a main signal according to the first input end and the second input end.

5. The scan-type display device control circuit according to claim 1, wherein the display buffer comprises:
   a first sub-register, logically connected to the line scan controller, for temporarily storing the line data of the first storage area;
   a second sub-register, logically connected to the line scan controller, for temporarily storing the line data of the second storage area; and
   a main register, for capturing the line data of the first sub-register or the second sub-register, wherein the main register is logically connected to the scrambled PWM signal generating device.

6. The scan-type display device control circuit according to claim 5, wherein the line scan controller has an instruction input port, when the instruction input port receives a frame switching instruction, the main register captures data from the second sub-register instead of the first sub-register originally or from the first sub-register instead of the second sub-register originally.

* * * * *